US011620988B2

(12) United States Patent
Ljolje et al.

(10) Patent No.: US 11,620,988 B2
(45) Date of Patent: *Apr. 4, 2023

(54) SYSTEM AND METHOD FOR SPEECH PERSONALIZATION BY NEED

(71) Applicant: Nuance Communications, Inc., Burlington, MA (US)

(72) Inventors: Andrej Ljolje, Morris Plains, NJ (US); Alistair D. Conkie, San Jose, CA (US); Ann K. Syrdal, San Jose, CA (US)

(73) Assignee: Nuance Communications, Inc., Burlington, MA (US)

( * ) Notice: Subject to any disclaimer, the term of this patent is extended or adjusted under 35 U.S.C. 154(b) by 261 days.

This patent is subject to a terminal disclaimer.

(21) Appl. No.: 16/707,262

(22) Filed: Dec. 9, 2019

(65) Prior Publication Data
US 2020/0111479 A1 Apr. 9, 2020

Related U.S. Application Data

(63) Continuation of application No. 15/830,511, filed on Dec. 4, 2017, now Pat. No. 10,504,505, which is a (Continued)

(51) Int. Cl.
*G10L 15/07* (2013.01)
*G10L 15/10* (2006.01)
*G10L 15/26* (2006.01)

(52) U.S. Cl.
CPC .............. *G10L 15/07* (2013.01); *G10L 15/10* (2013.01); *G10L 15/26* (2013.01)

(58) Field of Classification Search
CPC ......... G10L 15/00; G10L 15/01; G10L 15/02; G10L 15/06; G10L 15/063; G10L 15/065;
(Continued)

(56) References Cited

U.S. PATENT DOCUMENTS 5,640,485 A 6/1997 Ranta
6,141,641 A 10/2000 Hwang et al.
(Continued)

FOREIGN PATENT DOCUMENTS

WO WO-02091724 A1 * 11/2002 ....... H04L 29/06027

*Primary Examiner* — Paras D Shah
(74) *Attorney, Agent, or Firm* — Barta, Jones & Foley, PLLC

(57) ABSTRACT

Disclosed herein are systems, computer-implemented methods, and tangible computer-readable storage media for speaker recognition personalization. The method recognizes speech received from a speaker interacting with a speech interface using a set of allocated resources, the set of allocated resources including bandwidth, processor time, memory, and storage. The method records metrics associated with the recognized speech, and after recording the metrics, modifies at least one of the allocated resources in the set of allocated resources commensurate with the recorded metrics. The method recognizes additional speech from the speaker using the modified set of allocated resources. Metrics can include a speech recognition confidence score, processing speed, dialog behavior, requests for repeats, negative responses to confirmations, and task completions. The method can further store a speaker personalization profile having information for the modified set of allocated resources and recognize speech associated with the speaker based on the speaker personalization profile.

16 Claims, 4 Drawing Sheets

Related U.S. Application Data continuation of application No. 14/679,508, filed on Apr. 6, 2015, now Pat. No. 9,837,071, which is a continuation of application No. 12/480,864, filed on Jun. 9, 2009, now Pat. No. 9,002,713.

(58) Field of Classification Search
CPC ....... G10L 15/07; G10L 15/075; G10L 15/20; G10L 15/22; G10L 15/26; G10L 15/265; G10L 15/285; G10L 15/27; G10L 17/00; G10L 17/005; G10L 17/04; G10L 17/22; G10L 17/24

See application file for complete search history.

(56) References Cited

U.S. PATENT DOCUMENTS

| | | |
|---|---|---|
| 6,484,136 B1 | 11/2002 | Kanevsky et al. |
| 6,633,846 B1 | 10/2003 | Bennett et al. |
| 6,728,677 B1 | 4/2004 | Kannan et al. |
| 6,947,894 B1 | 9/2005 | Engstrom |
| 7,100,000 B1 | 8/2006 | Ittycheriah |
| 7,137,126 B1 | 11/2006 | Coffman et al. |
| 7,191,130 B1 | 3/2007 | Leggetter et al. |
| 7,197,459 B1 | 3/2007 | Harinarayan et al. |
| 7,203,643 B2 | 4/2007 | Garudadri |
| 7,209,880 B1 | 4/2007 | Gajic et al. |
| 7,302,390 B2 | 11/2007 | Yang et al. |
| 7,324,945 B2 | 1/2008 | Butzberger et al. |
| 7,386,443 B1 | 6/2008 | Parthasarathy et al. |
| 7,454,608 B2 | 11/2008 | Gopalakrishnan et al. |
| 7,636,432 B2 | 12/2009 | Bushey et al. |
| 7,693,718 B2 | 4/2010 | Jan et al. |
| 7,778,822 B2 | 8/2010 | Ohlgren |
| 7,908,143 B2 | 3/2011 | Kanker et al. |
| 7,949,529 B2 | 5/2011 | Weider et al. |
| 7,953,603 B2 | 5/2011 | De Armas et al. |
| 8,103,873 B2 | 1/2012 | Claudatos et al. |
| 8,131,548 B2 | 3/2012 | Blass et al. |
| 8,199,888 B2 | 6/2012 | Chang et al. |
| 2001/0029452 A1 | 10/2001 | Chen |
| 2002/0065654 A1 | 5/2002 | Grant et al. |
| 2002/0116197 A1* | 8/2002 | Erten ................... G06K 9/6292 704/273 |
| 2002/0161578 A1 | 10/2002 | Saindon et al. |
| 2003/0088403 A1 | 5/2003 | Chan |
| 2004/0064317 A1 | 4/2004 | Othmer et al. |
| 2005/0010407 A1 | 1/2005 | Jaroker |
| 2006/0015341 A1 | 1/2006 | Baker |
| 2006/0095267 A1 | 5/2006 | Yano et al. |
| 2006/0155543 A1 | 7/2006 | Copper |
| 2007/0005372 A1 | 1/2007 | Huning et al. |
| 2007/0038462 A1 | 2/2007 | Abbott et al. |
| 2007/0136059 A1 | 6/2007 | Gadbois |
| 2007/0203708 A1 | 8/2007 | Polcyn |
| 2008/0059191 A1 | 3/2008 | Huang |
| 2008/0080552 A1* | 4/2008 | Gates .................... H04L 12/66 370/468 |
| 2008/0140390 A1 | 6/2008 | Xia |
| 2008/0177541 A1 | 7/2008 | Satomura |
| 2009/0052636 A1 | 2/2009 | Webb et al. |
| 2009/0150156 A1 | 6/2009 | Kennewick |
| 2010/0179811 A1 | 7/2010 | Gupta |

* cited by examiner

SYSTEM AND METHOD FOR SPEECH PERSONALIZATION BY NEED

PRIORITY INFORMATION

The present application is a continuation of U.S. patent application Ser. No. 15/830,511, filed Dec. 4, 2017, which is a continuation of U.S. patent application Ser. No. 14/679,508, filed Apr. 6, 2015, now U.S. Pat. No. 9,837,071, issued Dec. 5, 2017, which is a continuation of U.S. patent application Ser. No. 12/480,864, filed Jun. 9, 2009, now U.S. Pat. No. 9,002,713, issued Apr. 7, 2015, the contents of which are incorporated herein by reference in their entirety.

BACKGROUND

1. Technical Field

The present application relates to speech recognition and more specifically to personalized speech recognition.

2. Introduction

Speech recognition applications rely on speech recognition models. Often, a generic speech model is used to recognize speech from multiple users. However, a single canonical model that represents all speakers generically is not well suited to many individuals in a given population. Individual speakers diverge from such a generic speech model in subtle and not so subtle ways. Thus, one possible approach is complete personalization, or providing a personal speech recognition model for each speaker. However, this solution has several flaws. Complete personalization for every speaker uses prohibitive resources, such as processing power, storage, and bandwidth. Further, not every speaker requires a personal speech recognition model. A generic model may adequately serve many speakers who are close to the generic model, so it is wasteful to provide a personal speech recognition model for those speakers. Another problem with personal speech recognition models for all users is that each model must be generated by a training phase with each individual speaker. For these reasons, speech recognition personalization is typically either viable with only a very small user base or not viable at all.

SUMMARY

Additional features and advantages will be set forth in the description which follows, and in part will be obvious from the description, or may be learned by practice of the disclosed embodiments. The features and advantages may be realized and obtained by means of the instruments and combinations particularly pointed out in the appended claims. These and other features will become more fully apparent from the following description and appended claims, or may be learned by the practice of the embodiments as set forth herein.

Disclosed are systems, computer-implemented methods, and tangible computer-readable storage media for speaker recognition personalization. The method includes recognizing speech received from a speaker interacting with a speech interface using a set of allocated resources, the set of allocated resources including bandwidth, processor time, memory, and storage. The method further includes recording metrics associated with the recognized speech, and after recording the metrics, modifying at least one of the allocated resources in the set of allocated resources commensurate with the recorded metrics, and recognizing additional speech from the speaker using the modified set of allocated resources. Metrics can include a speech recognition confidence score, processing speed, dialog behavior, requests for repeats, negative responses to confirmations, and task completions. The method can further store a speaker personalization profile having information for the modified set of allocated resources and recognize speech associated with the speaker based on the speaker personalization profile.

BRIEF DESCRIPTION OF THE DRAWINGS

In order to describe the manner in which the above-recited and other advantages and features of the disclosure can be obtained, a more particular description above will be rendered by reference to specific embodiments thereof which are illustrated in the appended drawings. Understanding that these drawings depict only exemplary embodiments and are not therefore to be considered to be limiting of its scope, this disclosure will provide with additional specificity and detail through the use of the accompanying drawings in which.

DETAILED DESCRIPTION

Various embodiments are discussed in detail below. While specific implementations are discussed, it should be understood that this is done for illustration purposes only. A person skilled in the relevant art will recognize that other components and configurations may be used without parting from the spirit and scope of the disclosure.

Existing speech recognition applications use generic speech recognition models for all speakers. Personalization creates user-specific acoustic models tailored to recognizing speech from a particular person. These user-specific acoustic models can include different transformations, dictionaries, language models, feature transformations, and so forth. The personalization approach can be very expensive in terms of time and effort to generate personalized models in terms of processing power, RAM, storage space, and bandwidth. Under ideal circumstances, personalized acoustic models would be available for all speakers. However, personalized acoustic models are rarely a requirement for the majority of the speakers. For a specific minority with unusual dialects and/or strong accents, such personalized models are valuable in order to use speech in any application. In one scenario, the system detects such speakers and provides a personalized speech recognition solution. The personalized speech recognition solution can be speaker or speaker-class specific. In one embodiment, a system determines a level of personalization for each speaker within a few utterances and applies the personalization progressively based on additional speech interactions with that speaker. Progressive personalization can occur as a user's accent changes over time, based on a topic of speech, or based on other factors.

The costs and effort involved in providing complete personalization for every speaker are prohibitive and often unnecessary. However in some cases, personalization is desirable. Most large scale deployments of speech recognition technology do not provide any personalization. In the case of deployment on personal computers, personalization involves training the recognizer for a specific speaker. Speech service providers using known approaches mostly ignore or very superficially and globally treat personalization. The approach disclosed herein provides personalization for a significantly increased segment of the speaker population. More people can successfully use speech applications with minimal additional expenditure on the recognition infrastructure.

Figure 1:
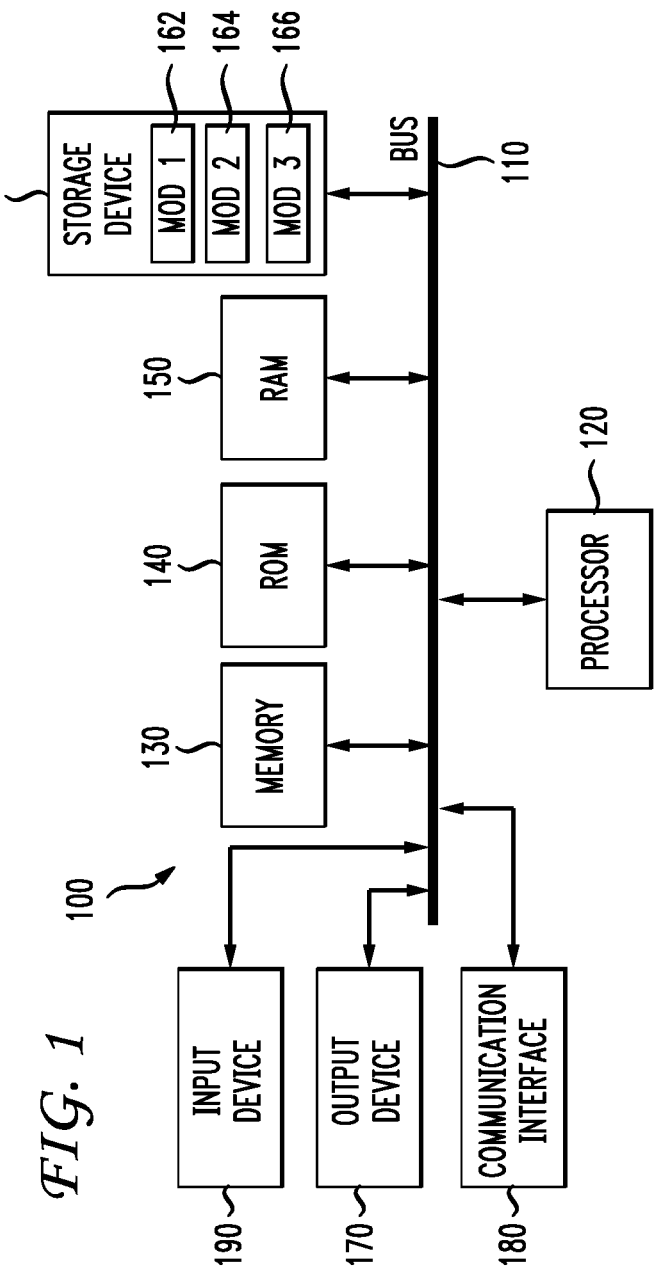
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. These and other modules can be configured to control the processor or CPU to perform various actions. Other system memory 130 may be available for use as well. It can be appreciated that the various embodiments may operate on a computing device with more than one CPU 120 or on a group or cluster of computing devices networked together to provide greater processing capability. A processing unit 120 can include a general purpose CPU controlled by software as well as a special-purpose processor. Of course, the processing unit 120 includes any general purpose CPU and a module configured to control the CPU as well as a special-purpose processor where software is effectively incorporated into the actual processor design. The processing unit 120 may essentially be a completely self-contained computing system, containing multiple cores or CPUs, a bus, memory controller, cache, etc. A multi-core processing unit may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer-readable media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. A communications interface 180 generally governs and manages the user input and system output. There is no restriction on any embodiment operating on any particular hardware arrangement and therefore the basic features here may easily be substituted for improved hardware or firmware arrangements as they are developed.

For clarity of explanation, the illustrative system embodiment is presented as including individual functional blocks (including functional blocks labeled as a "processor"). The functions these blocks represent may be provided through the use of either shared or dedicated hardware, including, but not limited to, hardware capable of executing software and hardware, such as a processor, that is purpose-built to operate as an equivalent to software executing on a general purpose processor. For example the functions of one or more processors presented in FIG. 1 may be provided by a single shared processor or multiple processors. Use of the term "processor" should not be construed to refer exclusively to hardware capable of executing software. Illustrative embodiments include microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

Figure 3:
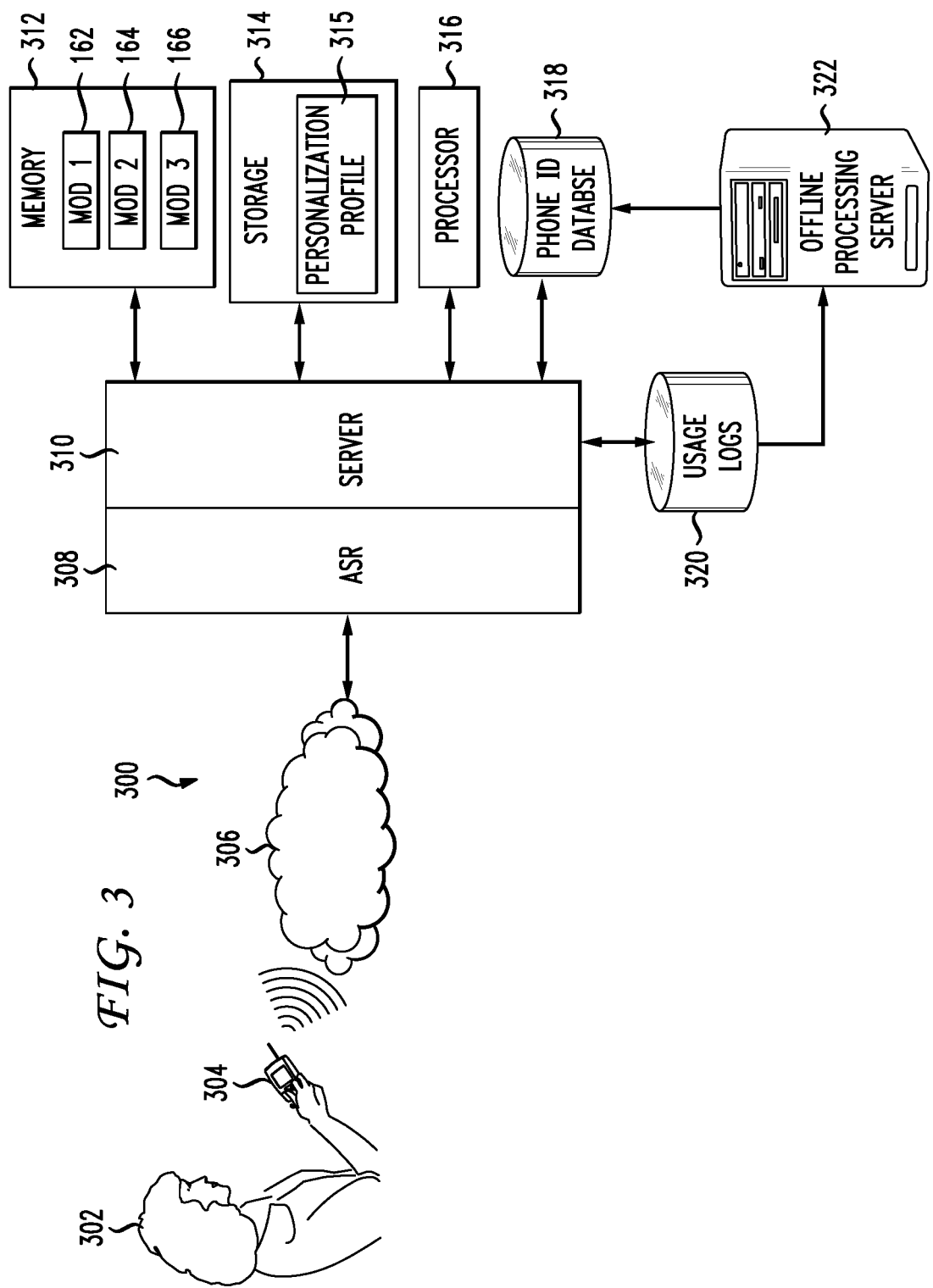
FIG. 3 illustrates an exemplary system for recognizing speech using speaker recognition personalization.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. Generally speaking, such logical operations can be implemented as modules configured to control a processor to perform particular functions according to the programming of the module. For example, FIG. 1 illustrates three modules Mod1 162, Mod2 164 and Mod3 166 which are modules configured to control the processor. These modules may be stored on the storage device 160 and loaded into RAM 150 or memory 130 at runtime or may be stored as would be known in the art in other computer-readable memory locations. In FIG. 3, these modules are shown in memory 312, but may be stored in other locations as well. It is understood that server 310 will include a processor and other components as those shown in FIG. 1.

Automatic speech recognition (ASR) is designed to allow callers to interact with automated systems in a natural way through speech. An example ASR system can include device 100 in FIG. 1 or a network-based system 300 in FIG. 3. For example, one or more of the modules 162, 164, 166 can include the necessary programming to control the system to receive speech input through input device 190 and control the processor to recognize the speech input and convert it to text. ASR can make people's lives easier through speech instead of or complementary to typing or other forms of input. ASR is not perfect; it makes mistakes. When speakers user ASR in busy or noisy circumstances, ASR typically doesn't perform well. As long as ASR works, most users accept some of the flaws and shortcomings. However for some people ASR almost never performs as desired because their English is not generic enough. Whole classes of speakers exist for which ASR will almost never work. A lot of expensive techniques can attempt to fix this problem in terms of hardware, connectivity, bandwidth, etc. These techniques provide only a marginal improvement for typical native English speaker, but for these other speakers, ASR shifts from being completely unusable to somewhat usable. This increase in usability is extremely noticeable and provides a concrete benefit for the affected speakers because they can successfully use speech interfaces.

When the system 100 or 300 receives speech from a user, the system also receives many criteria to detect category of speakers which may need help. The basic functions disclosed herein may be implemented via a standalone system or device 100 as shown in FIG. 1 or a network-based system 300 as shown in FIG. 3. FIG. 3 is discussed below in the case of the system 100 of FIG. 1, the system 100 can include modules such as 162, 164 and 166 that control the processor 120 to perform the functions of ASR and other dialog management functions in addition to the steps shown in FIG. 2. These speakers are the ones that require the most assistance, so the system dedicates resources (up to and including the most sophisticated, expensive, advanced adaptation schemes) effectively to those callers because otherwise the system is unusable for them. For speakers where ASR mostly works, the system does not dedicate expensive resources, and only provides the relatively inexpensive improvements. In this way, the system provides adaptation by speaker need.

Figure 2:
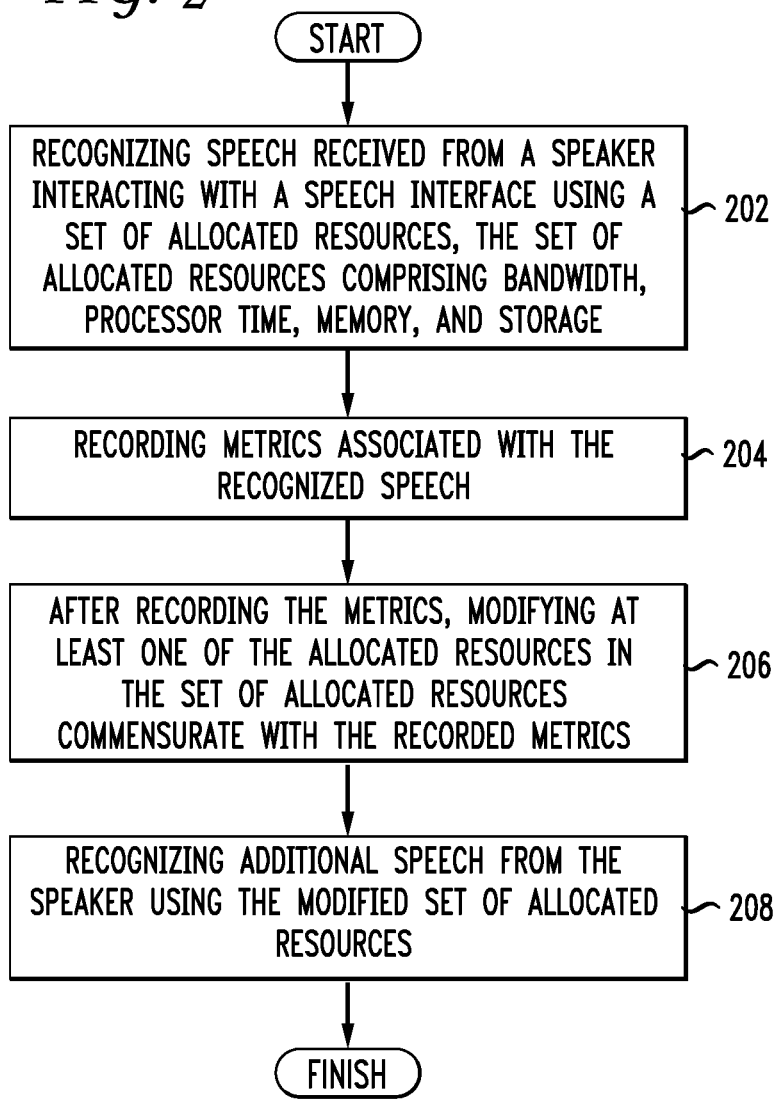
FIG. 2 illustrates an exemplary method embodiment for speaker recognition personalization.

Having disclosed some basic system 100, 300 components, the disclosure now turns to the exemplary method embodiment shown in FIG. 2. For the sake of clarity, the disclosure discusses the method in terms of a system 100, 300 configured to practice the method. In one embodiment, the various modules 162, 164, 166 can be stored on computer-readable storage media and configured to control the processor 120 or server 310 to perform the steps disclosed in FIG. 2 and other steps discussed herein. FIG. 2 illustrates an exemplary method embodiment for speaker recognition personalization. The system 100, 300 first recognizes speech received from a speaker interacting with a speech interface 100, 300 using a set of allocated resources, the set of allocated resources including bandwidth, processor time, memory, and storage (202) through a first recognition module.

The system 100, 300 then records metrics associated with the recognized speech (204) through a recording module. Some examples of observed metrics include speech recognition confidence score, processing speed, dialog behavior, requests for repeats, negative responses to confirmations, and task completions. Other metrics are contemplated as within the scope of this disclosure. Observations of metrics also include trends in the observed data over time, even if that time is short. The system 100, 300 can tailor these metrics to specific classes of callers or to specific tasks.

After recording the metrics, the system 100, 300 proceeds to modify at least one of the allocated resources in the set of allocated resources commensurate with the recorded metrics (206) through a modification module. The system 100, 300 can perform this step offline after receiving the speech or online while receiving the speech. The system 100, 300 can allocate increased resources based on a difficulty threshold associated with how well the speaker interacts with the speech interface 170, 190, 304. For example, if the system 100, 300 detects that the user is having only slight difficulty but is able to accomplish his goals, then no additional resources are needed. However, if the system 100, 300 detects great difficulty and/or frustration in the form of numerous repeated utterances or phrases expressing aggravation, then the system 100, 300 can allocate more available resources to assist in speech recognition for that speaker. In some extreme cases, allocating additional resources can even include transferring the caller to a live agent. In these cases, the system 100, 300 can continue to monitor the speaker's conversation with the live agent in order to improve the recognition next time that speaker or a speaker with a similar dialect calls.

The system 100, 300 can use a speaker personalization storage module to store a speaker personalization profile 315 in database 130, 314 to assist with the current received speech associated with the speaker or with additional received speech, the profile having information for the modified set of allocated resources. It can store the speaker personalization profile 315 on a personalization server containing multiple speaker personalization profiles. The system can recognize speech associated with the speaker based on the speaker personalization profile 315. Each speaker personalization profile 315 can be associated with multiple individual speakers or with a class of similar speakers.

The system 100, 300 recognizes additional speech from the speaker using the modified set of allocated resources (208) through a second recognition module. The allocated resources can be one or more of processing power, memory, storage space, and bandwidth. As mentioned above, allocated resources can also include live agents to take over the call. The system 100, 300 can apply a modified set of allocated resources progressively. The system 100, 300 can allocate resources in varying degrees and increase resources progressively as needed by the speaker. In another aspect, the system 100, 300 can transition between the original or baseline set of allocated resources and the modified set of allocated resources while recognizing the additional speech from the speaker. The system 100, 300 can commence this transition in part or in whole as soon as at least one resource allocation is modified.

In some cases, the system 100, 300 does not need to detect the category of the speaker because the system 100, 300 can preclassify the caller based on a phone ID or other identifier. The system 100, 300 can assume the caller category and retrieve an appropriate speaker personalization profile. When the system 100, 300 receives the additional speech, it can check if the speaker is the expected speaker or not and cancel the extra resources if they are not needed. The system 100, 300 can include, for example, a new dictionary, new acoustic model, new dialog manager, or any other appropriate resources. The system 100, 300 can essentially use any adaptation of anything to do with recognizing speech from the expected speaker. In one example, a particular speaker always talks about restaurants, so the system can adapt the dialog model to include a vocabulary directed to restaurants instead of a generic speech model or instead of an ill-suited specific vocabulary, such as a hardware store. The system 100, 300 can allocate additional bandwidth to transfer the model, computational power to load and/or process the new model, etc. The system 100, 300 can preallocate resources for callers if they call on a regular schedule or if the system otherwise has reason to expect a call from a particular speaker. The system 100, 300 can consider speaker usage history and select offline how many and which resources to allocate to the speaker. The various functions disclosed herein can be implemented in hardware via various modules 162, 164, 166 that are stored and configured to control a processor 120 to perform the specifically programmed function.

FIG. 3 illustrates an exemplary system for recognizing speech using speaker recognition personalization. The system 300 first receives speech from a speaker 302. The speaker can communicate via a telephone 304, computer, cellular phone, or any other audio communications device. Typically the system receives speech through a network 306 but the system can also receive speech through a direct connection. The speech can be live or it can be prerecorded. The system can include an automatic speech recognition (ASR) module 308 interfaced with a server 310. The server 310 can include components such as a memory 312, storage 314, and a processor 316. Storage 314 provides an exemplary location for a personalization profile base 315. This can be stored in other memory locations as well. These components and others are included as speech recognition resources.

The system 300 allocates additional resources or additional portions of resources for identified speakers. When the server 310 receives a telephone call from a speaker 302, the server 310 can also receive additional information from the telephone or communications device 304, such as automatic number identification (ANI) information. The server 310 identifies the caller 302 in a phone ID database 318. As the server 310 and ASR 308 conduct a dialog with the user 302, the server observes and stores metrics as usage logs 320. The server 310 can organize the usage logs 320 by individual or by groups of similar individuals. Groups of similar individuals can be formed based on geographical location. In one example, all residents of a small rural town are likely to speak in a similar manner. The server 310 can store a single common town-wide usage log for all speakers of that small rural town.

In some cases, the server 310 can begin to allocate additional resources for the user based on received ANI information, but the server 310 monitors the speaker to ensure that it is the expected speaker. For example, a user can lend his cellular phone to a friend to make a call. The extra resources which may be needed for the user may not be needed for the friend. In this case, the system can free the resources that were allocated for the expected speaker when it detects a less needy speaker (the friend). An offline processing server 322 can process the phone ID database 318 and the usage logs 320 to determine which callers need more attention, resources, or personalization. The offline processing server 322 can be separate or it can be incorporated as part of the server 310. The offline server 322 can perform several levels of analysis at varying levels of detail and depth. For example, the offline server 322 can check usage logs with a faster, lower accuracy scan to assign a rough priority value. Based on the rough priority values, the offline server can then analyze callers with higher rough priority values in greater depth. The offline server 322 can determine which resources are available and prioritize processing based on priority values and resource availability. As the user 302 calls in again or continues to speak, the system allocates additional resources to speaker personalization commensurate with the observed metrics and recognizes the additional speech using the allocated resources. The system can allocate additional resources dynamically. For example, if the system is part of a conference call system which accepts voice commands, the system monitors the conference call but does not need to apply the additional resources to recognizing speech from all the users. The system can apply additional resources to speech originating from those users who need it the most. The system can prepare acoustic models with transcription.

Figure 4A:
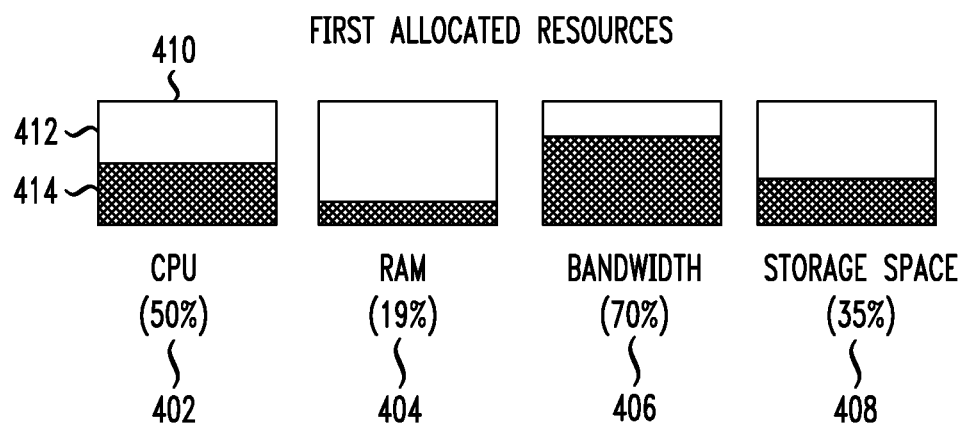
FIG. 4A illustrates a first set of allocated resources.
Figure 4B:
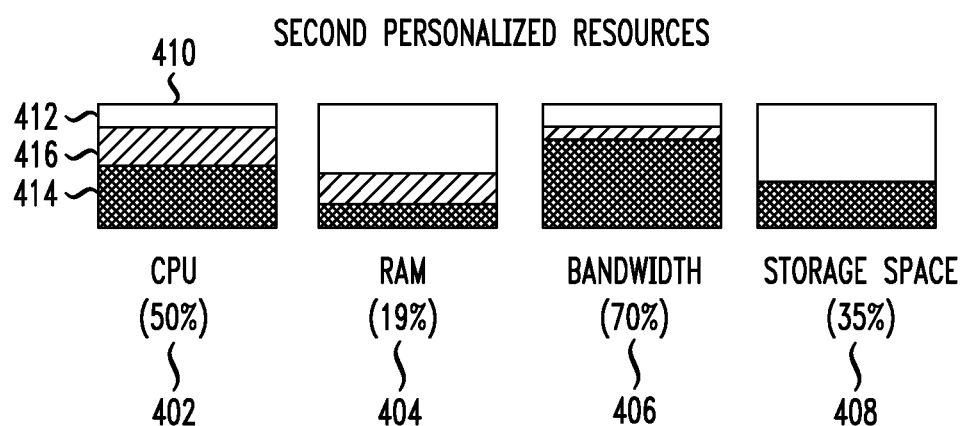
FIG. 4B illustrates a second set of personalized allocated resources.

FIG. 4A illustrates a first set of allocated resources such as CPU 402, RAM 404, bandwidth 406, and storage space 408. While these resources take very different forms and are measured in different ways, FIG. 4A represents these resources in a uniform manner as boxes 410 for purposes of explanation. The CPU 402 shows a portion 414 representing 50% of the available CPU power allocated and a 50% unallocated portion 412. Similarly, the RAM 404 shows a 19% allocated portion, the bandwidth 406 shows a 70% allocated portion, and the storage space shows a 35% allocated portion. This set can represent a default resource allocation for a typical speaker. However, when the system encounters a speaker that requires personalized resources, the system allocates a second set of personalized resources, shown in FIG. 4B. For instance, the system can determine that it requires additional CPU 402, RAM 404, and bandwidth 406, but no additional storage space 408. The box 410 for the CPU shows the original allocated portion 414 plus an additional allocated portion 416. The unallocated portion 410 shrinks accordingly. In this example, the CPU allocation increases from 50% in FIG. 4A to 86% in FIG. 4B. The RAM and bandwidth also increase. However, the system can determine that it needs no additional storage space, as shown in FIG. 4B. The system 100, 300 can increase or decrease allocated resources from the first set of resources to the second set. The system 100, 300 can allocate these resources by percentage of the available resource as shown in FIGS. 4A and 4B. The system can also allocate fixed amounts of resources instead of percentages, i.e. 32,768 KB of RAM or 120 Kb/s of combined sending and receiving bandwidth. The system 100, 300 can allocate one or more resources at multiple locations, such as bandwidth at multiple network segments and storage in multiple computers or devices. One example of this is allocating an amount of bandwidth in multiple routers and internal network segments. These allocated resources can represent a minimum desired level of service for the system. If the system 100, 300 requests extra resources beyond the allocated resources and they are available, the system can use those extra resources for as long as they are available. The allocation of a resource can be greater or less than the original or baseline allocation, meaning that usage of a particular resource can be less than it was in the unmodified set of allocated resources. The additional allocated resources are used in addition to the baseline or original allocated resources.

The system 100, 300 can provide various levels of personalization on a sliding cost scale, where cost encompasses processing, memory, and bandwidth requirements. It provides different levels of personalization to users based on the need to facilitate the successful use of speech applications. The system 100, 300 determines the need based on observed recognition confidence scores, processing speed, dialog behavior (such as requests to repeat or negative responses to confirmations), task completions, and a large number of other metrics that indicate the speaker's difficulty in interacting with the speech interface. The system 100, 300 makes a greater effort to minimize difficulties of using the speech interface when it detects that the user is encountering speech interface related problems. In this way, the system 100, 300 can efficiently allocate speech recognition resources to speakers with the greatest needs and maximize the benefit of additional resource expenses in setting up speech applications.

The system 100, 300 provides maximized performance improvement for the speakers that need it the most with minimal additional expenditures in processing power, memory and bandwidth. Speech and natural dialog applications provide an automated means of completing a task. As long as the user can complete a desired task, even if it at times the user must make additional effort to disambiguate misrecognitions, the system is successful. Using existing approaches, only a minority of speakers is unable to complete a desired task, irrespective of how much effort they make, because generic speech recognition models do not provide a good representation of their unique voice, dialect, and/or accent. This approach makes available the best personalization approaches to the neediest speakers with minimal additional expense, thereby maximizing the impact of investing additional resources beyond a baseline or default level. The costs of this approach are significantly lower than the cost of providing personalization for every speaker.

Embodiments disclosed herein may also include tangible computer-readable storage media for carrying or having computer-executable instructions or data structures stored thereon. Such computer-readable media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, data structures, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed as limiting. For example, the principles herein are also applicable to voice over IP (VoIP), automatic speech recognition, natural language dialog systems, and speech commands. Those skilled in the art will readily recognize various modifications and changes that may be made to the present disclosure without following the example embodiments and applications illustrated and described herein, and without departing from the true spirit and scope of the disclosed embodiments.

We claim:

1. A method comprising:
    recognizing, at a first time and via a speech interface in a first configuration, speech for each of a plurality of speakers simultaneously participating in a conference call;
    identifying a speaker from the plurality of speakers to yield an identified speaker;
    while processing further speech from the plurality of speakers in the conference call, modifying, via a processor, an allocation of computer resources of the speech interface in the first configuration based on an observed metric such that increased computer resources are dedicated to processing speech from the identified speaker to yield a speech interface in a second configuration, wherein the observed metric is gathered based on the recognizing of the speech for the plurality of speakers, the observed metric associated with at least one of a speech recognition confidence score or dialog behavior and at least one of numerous repeated utterances or phrases expressing aggravation;
    recognizing, at a second time and via the speech interface in the second configuration, additional speech from at least one other speaker of the plurality of speakers in the conference call; and
    further modifying, via the processor, the allocation of computer resources of the speech interface in the second configuration based on the observed metric such that decreased computer resources of the speech interface are dedicated to processing speech from the other speaker to yield a speech interface in a third configuration.

2. The method of claim 1, wherein the observed metric is further recorded via a recording module.

3. The method of claim 1, wherein the computer resources of the speech interface includes at least one of bandwidth, storage, memory, and processor time.

4. The method of claim 1, wherein the further modification is based at least in part on a difficulty threshold associated with how the other speaker interacts with the speech interface in the second configuration.

5. The method of claim 1, wherein the speech interface in the second configuration further takes into account gestures of the identified speaker.

6. The method of claim 1, further comprising storing a speaker personalization profile having information for the speech interface in the second configuration.

7. The method of claim 6, further comprising recognizing speech associated with the identified speaker based on the speaker personalization profile.

8. The method of claim 1, wherein the speech interface in the second configuration is associated with a class of similar speakers.

9. The method of claim 1, wherein the modifying of the allocation of computer resources is further based on a difficulty threshold associated with how well the identified speaker interacts with the speech interface in the first configuration.

10. The method of claim 1, further comprising progressively applying the speech interface in the second configuration.

11. The method of claim 1, wherein the increased computer resources comprise at least one of additional nodes, additional memory, additional processors, and additional storage.

12. The method of claim 1, wherein an allocation of computer resources in the speech interface in the second configuration is greater than a corresponding allocation in a set of allocated computer resources in the speech interface in the first configuration.

13. A speech recognition system comprising:
a processor; and
a computer-readable storage medium having instructions stored which, when executed by the processor, cause the processor to perform operations comprising:
recognizing, at a first time and via the speech recognition system in a first configuration, speech for each of a plurality of speakers simultaneously participating in a conference call;
identifying a speaker from the plurality of speakers to yield an identified speaker;
while processing further speech from the plurality of speakers in the conference call, modifying an allocation of computer resources in the speech recognition system based on an observed metric such that increased computer resources are dedicated to processing speech from the identified speaker, to yield the speech recognition system in a second configuration, wherein the observed metric is gathered based on the recognizing of the speech for the plurality of speakers, the observed metric associated with at least one of a speech recognition confidence score or dialog behavior;
recognizing, at a second time and via the speech recognition system in the second configuration, additional speech from at least one other speaker of the plurality of speakers in the conference call; and
further modifying, via the processor, the allocation of computer resources of the speech interface based on the observed metric such that decreased computer resources of the speech interface are dedicated to processing speech from the other speaker, to yield a speech interface in a third configuration, wherein the further modification is based at least in part on a difficulty threshold associated with how the other speaker interacts with the speech interface in the second configuration.

14. The speech recognition system of claim 13, wherein the speech recognition system in the second configuration further takes into account gestures of the identified speaker.

15. The speech recognition system of claim 13, wherein the observed metric is further associated with at least one of numerous repeated utterances or phrases expressing aggravation.

16. The speech recognition system of claim 13, wherein the computer resources of the speech interface includes at least one of bandwidth, storage, memory, and processor time.

\* \* \* \* \*